(12) United States Patent
Gretz

(10) Patent No.: US 6,774,304 B1
(45) Date of Patent: Aug. 10, 2004

(54) SIDING BOX ASSEMBLY

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 10/657,868

(22) Filed: Sep. 9, 2003

(51) Int. Cl.[7] .............................................. H02G 3/08
(52) U.S. Cl. ........................... 174/50; 174/58; 174/48; 220/3.2; 220/3.3
(58) Field of Search .......................... 174/50, 58, 57, 174/53, 48, 63, 17 R, 65 R; 220/3.2, 3.3, 3.8, 3.6, 4.02

(56) References Cited

U.S. PATENT DOCUMENTS

| | | | |
|---|---|---|---|
| 4,012,580 A | * 3/1977 | Arnold | 174/53 |
| 4,082,915 A | * 4/1978 | Silver | 174/65 R |
| 4,134,636 A | 1/1979 | Kleinatland et al. | |
| 4,794,207 A | 12/1988 | Norberg et al. | |
| 4,922,056 A | 5/1990 | Larsson | |
| 5,287,665 A | 2/1994 | Rath, Jr. | |
| 5,804,764 A | * 9/1998 | Gretz | 174/53 |
| 5,939,671 A | * 8/1999 | Gretz | 174/50 |
| 6,051,786 A | * 4/2000 | Gretz | 174/57 |
| 6,239,368 B1 | * 5/2001 | Gretz | 174/57 |
| 6,516,966 B1 | 2/2003 | Leonard | |
| 6,604,798 B1 | * 8/2003 | Cooney | 174/53 |

* cited by examiner

*Primary Examiner*—Dean A. Reichard
*Assistant Examiner*—Angel R. Estrada

(57) ABSTRACT

A siding block comprising an electrical junction box and a cover for mounting a light fixture to the exterior of a building. The electrical junction box includes a back wall, a front peripheral wall, and a recessed area within the back wall having one or more removable wall sections within the recessed area. One or more of the removable wall sections can be removed and an electrical cable connector inserted therein to provide strain relief attachment of an electrical cable therein. The electrical junction box includes two or more posts integral with and extending from the front peripheral wall and including fastener-accepting portions. The cover includes a central opening and a rear peripheral wall surrounding the central opening. The rear peripheral wall of the cover is adapted to slidingly engage the front peripheral wall of the electrical junction box in such a manner that the fastener accepting portions of the posts are situated within the rear peripheral wall of the cover when the cover and the electrical junction box are slidingly engaged.

7 Claims, 4 Drawing Sheets

SIDING BOX ASSEMBLY

FIELD OF THE INVENTION

This invention relates to electrical junction boxes and specifically to a siding box assembly for simplifying the task of mounting a light fixture on the exterior of a building.

BACKGROUND OF THE INVENTION

Many homeowners find it desirable to improve the attractiveness and nighttime visibility around their homes by installing exterior lighting fixtures. Many of these are mounted directly to the outside surface of the house. Several prior art enclosures are available for accommodating exterior wall-mounted electrical fixtures. These commonly feature several separate configurations to accommodate various types of electrical devices, such as light fixtures, duplex receptacles, or switches.

Modern construction techniques typically increase the complexity of mounting exterior electrical fixtures. The exterior surface of a home may typically include irregular shaped surfaces, such as lapped siding, which does not present the desired flat surface for accommodating a typically box-shaped mounting block. For some exterior finishes, such as those with stucco finishes, the substrate beneath the stucco may consist of a sheet structure such as Celotex®, a foam board that does not have the structural integrity to accept fasteners.

To simplify the task of installing an electrical fixture on the exterior of a building, the present inventor has provided several siding boxes. U.S. Pat. No. 5,804,764 to Gretz (hereinafter the '764 patent), for example, provided a two-piece siding box and cover assembly that included an UL-listed (Underwriters Labs) electrical junction box for housing electrical connections. The box included a breakaway rear flange. For mounting on an unfinished exterior surface, the rear flange could be retained and mounted on the wall. The exterior finish, such as lapped siding, could then be laid overtop the flange. Alternatively, for mounting on a finished house, a hole could be cut in the lapped siding, the breakaway rear flange on the box removed, and the box mounted within the newly created hole to the substrate. Unfortunately, for those situations in which the substrate cannot accept fasteners, the mounting block of the '764 patent was not entirely acceptable, as it forced homeowners to locate the box over a stud.

To provide more utility for mounting electrical fixtures to the exterior of a building, U.S. Pat. Nos. 6,051,786 and 6,239,368 (hereinafter the '786 and '368 patents) to Gretz provided a two-piece siding box having a rear edge conforming to the profile of lapped siding to which it may be attached. This siding box enabled easy installation by simply laying the rear edge over the lapped siding and driving fasteners directly into the siding.

Although the '786 and '368 patents simplified the task of mounting electrical fixtures to an exterior surface having lapped siding, the numerous styles of lapped siding available made it necessary to provide several mounting blocks with various rear edge geometries to accommodate the various lapped siding styles. In addition, the mounting block was not universal in that it was not easily used on flat surfaces.

Another drawback with the mounting block of the '764, '786, and '368 patents was the fact that the mounting blocks and associated covers had straight edges, necessitating that the straight edge of the cover be carefully lined up with the edge of the lapped siding to create an attractive finished installation. For those installations in which a hole was cut in the siding to expose the substrate, it became imperative for the homeowner to mark and cut very accurately to insure that the installed box and cover were lined up correctly with the siding.

Therefore, as can be seen from the above discussion, prior art siding boxes suffer several disadvantages when used on surfaces having lapped siding or a weak underlying substrate, such as foam board. When the siding were removed for direct mounting to the substrate, it was difficult to cut an appropriate hole and align it exactly with the siding. When the siding was retained, it was imperative to obtain a mounting block with a rear edge with the proper geometry conforming to the geometry of the actual siding it was mounted against.

SUMMARY OF THE INVENTION

The invention is a siding block including an electrical junction box and a cover for mounting a light fixture to the exterior of a building. The electrical junction box includes a back wall, a front peripheral wall, and a recessed area within the back wall having one or more removable wall sections within the recessed area. One or more of the removable wall sections can be removed and an electrical cable connector inserted therein to provide strain relief attachment of an electrical cable therein. The electrical junction box includes two or more posts integral with and extending from the front peripheral wall and including fastener-accepting portions. The cover includes a central opening and a rear peripheral wall surrounding the central opening. The rear peripheral wall of the cover is adapted to slidingly engage the front peripheral wall of the electrical junction box in such a manner that the fastener accepting portions of the posts are situated within the rear peripheral wall of the cover when the cover and the electrical junction box are slidingly engaged.

OBJECTS AND ADVANTAGES

The siding box assembly of the present invention provides an electrical junction box that is UL-listed to meet the requirements of the electrical code. It has the advantage of working on all siding types and can be installed before or after the siding is installed.

By providing an electrical box in a circular shape, the siding box assembly of the present invention greatly simplifies the task of installing a light fixture on the exterior of a building. Prior art siding boxes are typically rectangular, thereby requiring the installer to properly orient the straight edges of the rectangular box with the siding of the house. Properly aligning a rectangular box consumes time. By providing a circular box and cover, the requirement to align edges is eliminated. Additionally, the box is provided in a size for which a the mounting location can be prepared by using a simple hole saw, instead of the complex cuts required by a rectangular mount. Thus, site preparation is vastly simpler thereby making installation fast and easy.

The siding box assembly also eases installation by including a non-metallic (NM) cable connector in a recessed area in the back side of the junction box. An electrical cable can therefore be easily fed through the cable connector to provide electrical supply to the junction box.

The design of the siding box assembly allows the electrical box, cover, and NM cable connector to be produced by injection molding of plastics. This reduces production expense and thereby allows economical production of the siding box assembly.

These and other objects and advantages of the present invention will be better understood by reading the following description along with reference to the drawings.

TABLE OF NOMENCLATURE

Figure 1:
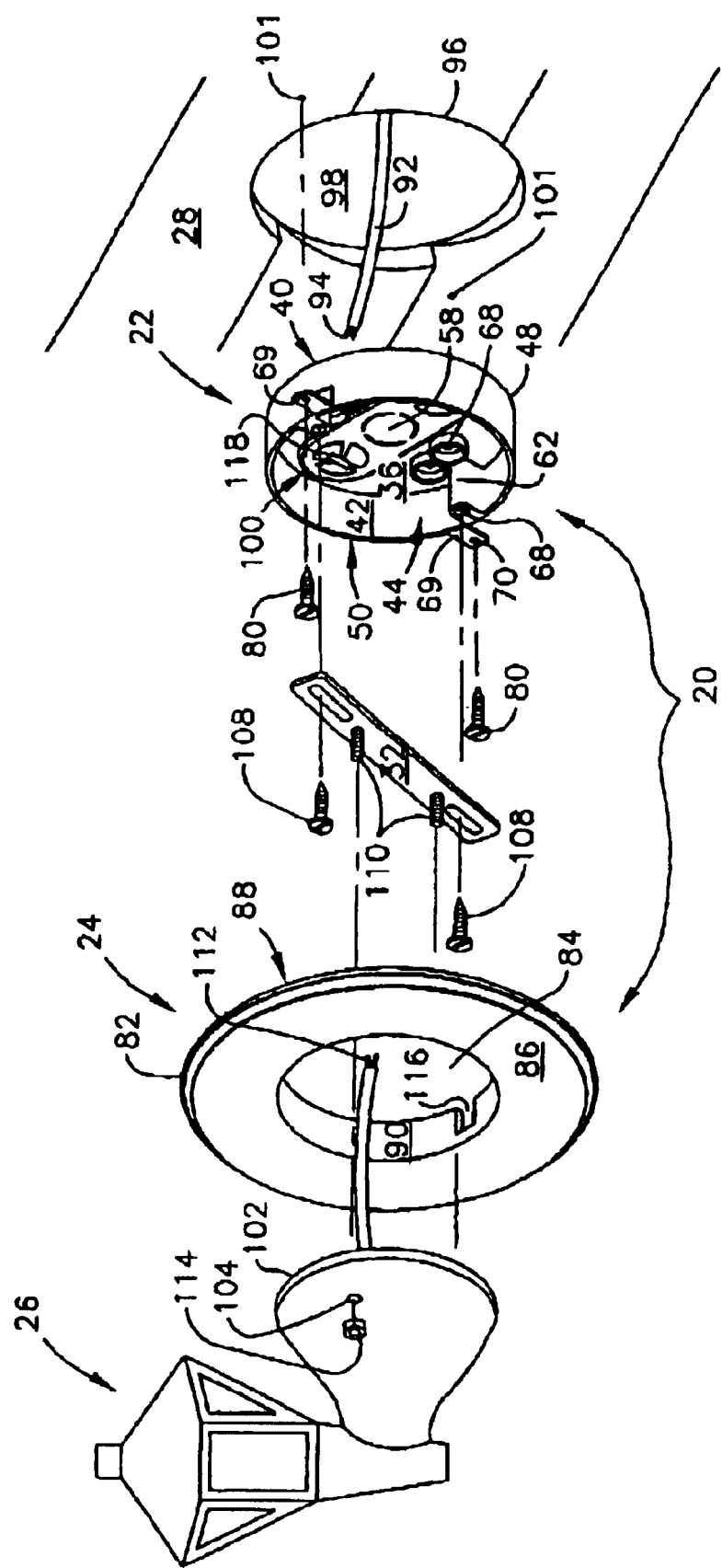
FIG. 1 is an exploded perspective view of a siding box kit being used to mount a light fixture and including an electrical junction box and a cover according to the present invention.

The following is a listing of part numbers used in the drawings along with a brief description:

| Part Number | Description |
| --- | --- |
| 20 | siding box assembly |
| 22 | electrical junction box |
| 24 | cover |
| 26 | light fixture |
| 28 | vertical exterior surface of a building |
| 30 | lapped siding |
| 32 | mounting bar |
| 36 | back wall of electrical junction box |
| 38 | front surface of back wall |
| 40 | rear surface of back wall |
| 42 | front peripheral wall of electrical junction box |
| 44 | interior volume of electrical junction box |
| 48 | base of front peripheral wall |
| 50 | planar top edge of front peripheral wall |
| 52 | first portion of back wall |
| 54 | raised portion of back wall |
| 56 | recessed area |
| 58 | removable wall portions |
| 60 | aperture in first portion of back wall |
| 62 | posts |
| 64 | inside surface of front peripheral wall |
| 66 | top of post |
| 68 | fastener-accepting aperture |
| 69 | ear |
| 70 | aperture in ear |
| 71 | V-shaped cross-sectional perimeter |
| 72 | bridge |
| 74 | gap |
| 76 | boss |
| 78 | perimeter wall |
| 80 | box-anchoring fastener |
| 82 | outer periphery of cover |
| 84 | central opening of cover |
| 86 | front surface of cover |
| 88 | rear surface of cover |
| 90 | rear peripheral wall |
| 92 | electrical supply cable |
| 94 | wiring leads of electrical supply |
| 96 | circular hole |
| 98 | substrate |
| 100 | electrical supply opening |
| 101 | apertures in surrounding exterior covering |
| 102 | base of light fixture |
| 104 | apertures in base of light fixture |

-continued

| Part Number | Description |
| --- | --- |
| 108 | mounting bar fastener |
| 110 | light fixture fasteners |
| 112 | fixture wiring leads |
| 114 | cap nuts |
| 116 | groove in rear peripheral wall of cover |
| 118 | C-shaped fitting |

DETAILED DESCRIPTION OF THE INVENTION

The present invention comprises a siding box assembly for mounting a light fixture on the exterior wall of a building. With reference to FIG. 1 there is shown a siding box assembly 20 including an electrical junction box 22 and a cover 24. The electrical junction box 22 and cover 24 are used to mount a light fixture 26 to the vertical exterior surface 28 of a building which in FIG. 1 consists of lapped siding 30. A mounting bar 32 is typically provided with the light fixture 26.

Figure 2:
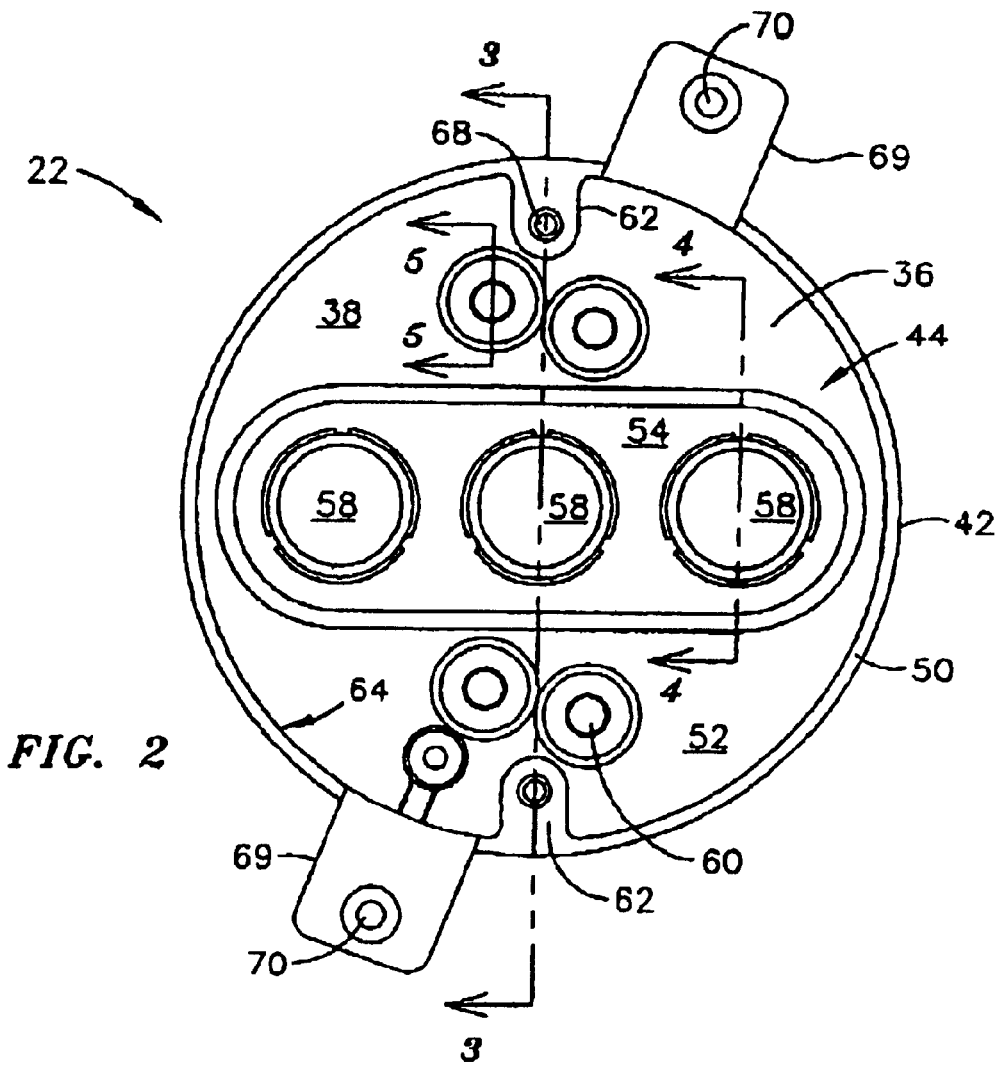
FIG. 2 is a bottom plan view of the electrical junction box of FIG. 1.
Figure 3:
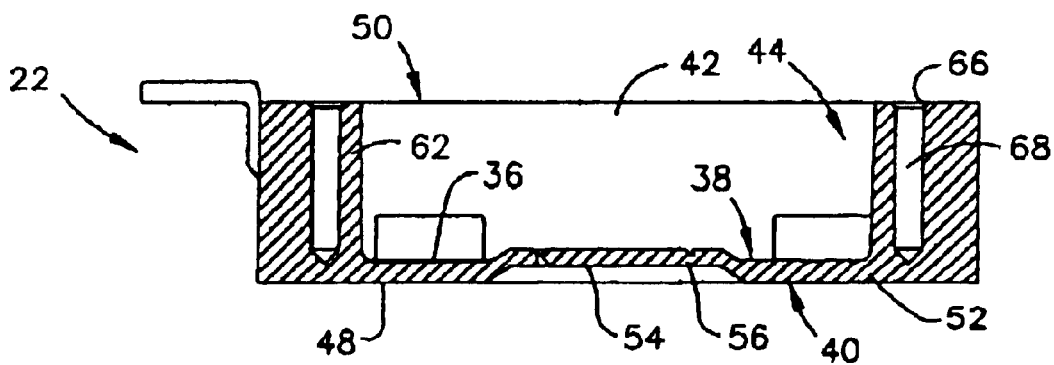
FIG. 3 is cross-sectional view of the electrical junction box taken along lines 3—3 of FIG. 2.

Referring to FIGS. 2 and 3, a preferred embodiment of an electrical junction box 22 according to the present invention includes a back wall 36 having a front surface 38, a rear surface 40, and a front peripheral wall 42 extending from the front surface 38 defining an interior volume 44 therein. The front peripheral wall 42 of the electrical junction box 22 includes a base 48 and a planar top edge 50. The back wall 36 includes a first portion 52 planar with the base of the front peripheral wall 42 and a raised portion 54 interior of the first portion 52. The raised portion 54 extends from the first portion 52 into the interior volume 44. The raised portion 54 defines a recessed area 56 in the rear surface 40 of the back wall 36.

The electrical junction box 22 includes one or more removable wall portions 58 in the raised portion 54 of the back wall 36 and one or more apertures 60 in the first portion 52. Two or more posts 62 are integral with the inside surface 64 of the front peripheral wall 42 and extend from the base 48 to the top edge 50 of the electrical junction box 22. The posts 62 include a top 66 that is planar with the planar top edge 50 of the front peripheral wall 42 of the electrical junction box 22. The posts 62 include fastener-accepting apertures 68 in their tops 66.

The electrical junction box 22 also includes two or more ears 69 integral with and extending outwardly from the front peripheral wall 42 and including apertures 70 therein.

Figure 4:
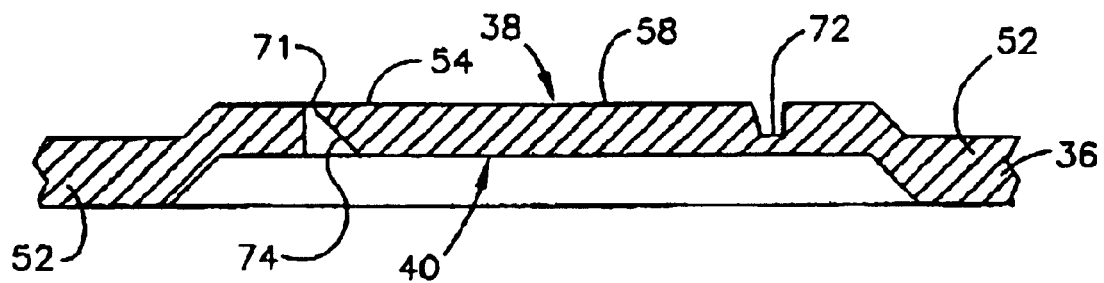
FIG. 4 is a cross-sectional view of a portion of the electrical junction box taken along lines 4—4 of FIG. 2.

With reference to FIG. 4, a cross-sectional view of a portion of the electrical junction box 22 shows part of the first portion 52 and the raised portion 54 of the back wall 36. The removable wall portions 58 include a V-shaped cross-sectional perimeter 71 that separates the removable wall portion 58 from the raised portion 54 except for two or more bridges 72 that bridge the gap 74 between the perimeter 71 of the removable wall portion 58 and the raised portion 54. The removable wall portions 58 can be removed by hand or by the use of a screwdriver to create an opening in the back wall 36 of the junction box 22.

Figure 5:
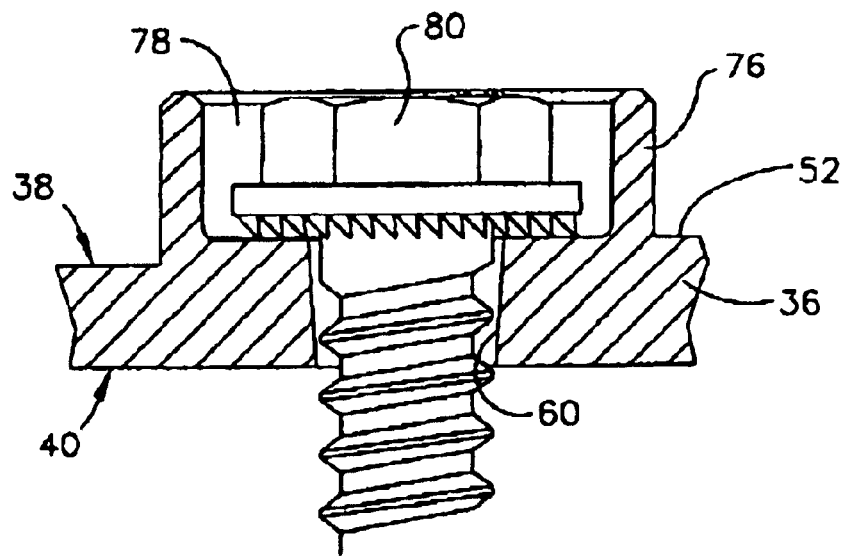
FIG. 5 is a cross-sectional view of a portion of the electrical junction box taken along lines 5—5 of FIG. 2.

Referring to FIG. 5, is a cross-sectional view is shown of the aperture 60 in the first portion 52 of the back wall 36 of the electrical junction box 22. A boss 76 extends from the front surface 38 of the back wall 36 to provide a perimeter wall 78 to encircle any box-anchoring fastener 80 that is inserted therein. The perimeter wall 78 shields the box-anchoring fastener 80 from any wiring that is held within the electrical junction box.

Figures 6, 7:
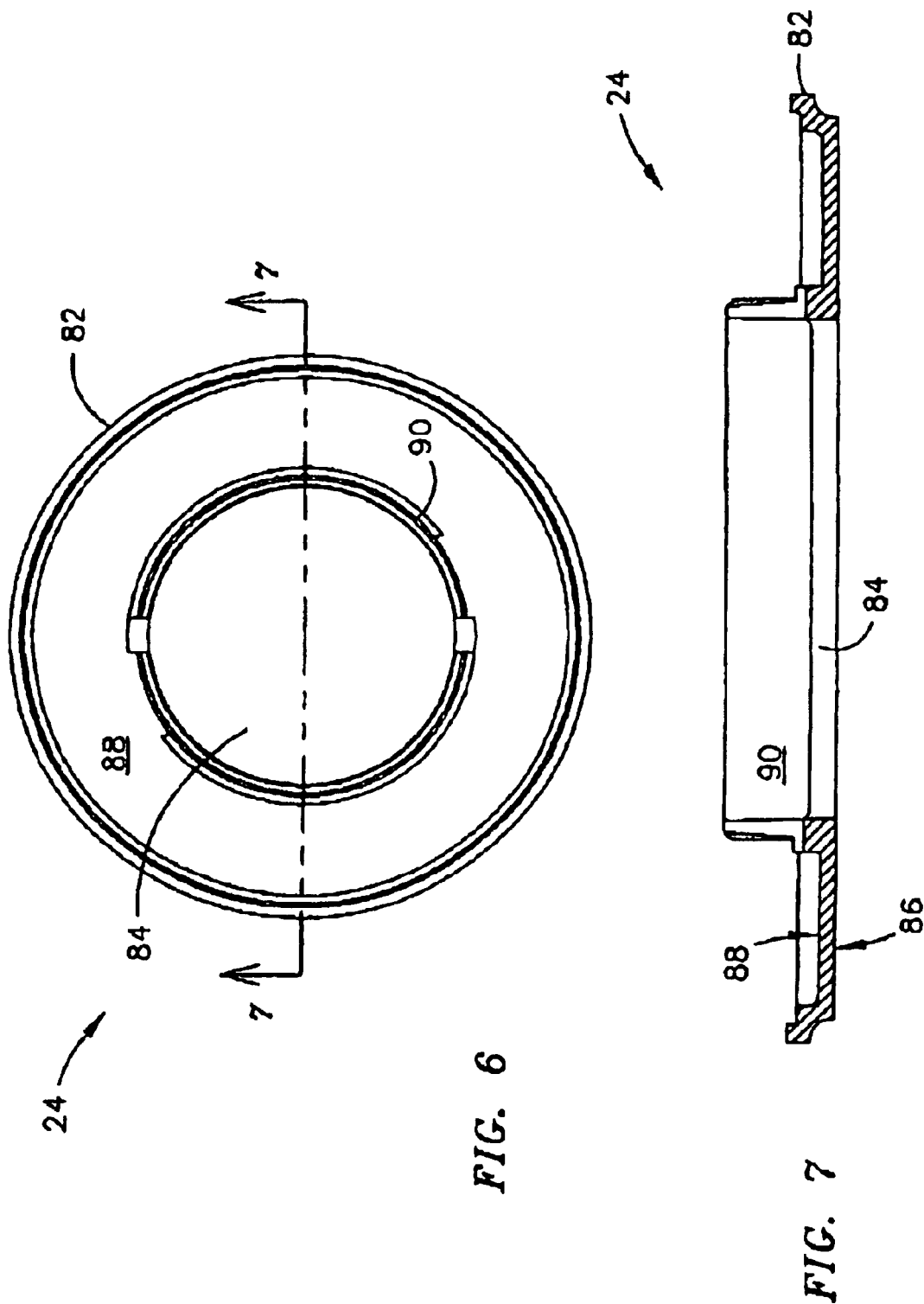
FIG. 6 is a bottom plan view of the cover of FIG. 1.
FIG. 7 is a cross-sectional view of the cover taken along lines 7—7 of FIG. 6.

Referring to FIGS. 6 and 7, a preferred embodiment of a cover 24 according to the present invention is shown. The cover 24 includes an outer periphery 82, a central opening 84, a front surface 86, a rear surface 88, and a rear peripheral wall 90 extending from the rear surface 88 of the cover 24 and substantially surrounding the central opening 84.

For operation of the present invention, reference should be taken the exploded perspective view of FIG. 1. The siding box assembly 20 of the present invention provides a method for mounting a light fixture 26 to a vertical exterior surface 28 of a building. To install a light fixture 26 a suitable mounting location is first located on the exterior surface 28 of the building. The mounting location typically includes an electrical supply such as an electrical cable 92 having wiring leads 94. The exterior vertical surface 28 of a building typically includes an exterior covering such as lapped siding 30. A circular hole 96 is first created in the exterior covering 30 and the covering removed from the circular hole to expose the substrate 98 of the exterior covering 30. One or more of the removable wall portions 58 are removed from the back wall 36 of the electrical junction box 22 to create an electrical supply opening 100 therein. The electrical supply 92 of the building is then pulled through the electrical supply opening 100 into the interior volume 44 of the electrical junction box 22. The electrical junction box 22 is then placed into the circular hole 96 such that the rear surface 40 of the electrical junction box 22 faces the substrate 98. The electrical junction box 22 is then secured to the building by driving the box-anchoring fasteners 80 through the apertures 70 in the ears 69 and into apertures 101 in the surrounding exterior covering 30. Exterior light fixtures 26 for vertical surface mounting typically include a base 102, apertures 104 in the base 102, a mounting bar 32, mounting bar fasteners 108, light fixture fasteners 110 secured to the mounting bar 32, fixture wiring leads 112; and cap nuts 114. The mounting bar 32 is secured to the fastener-accepting apertures 68 of the posts 62 with the mounting bar fasteners 108. The cover 24 is then connected to the electrical junction box 22 by sliding the rear peripheral wall 90 of the cover 24 onto the front peripheral wall 42 of the electrical junction box 22. The light fixture 26 is then secured to the siding box assembly 20 by positioning the base 102 of the light fixture 26 with the base apertures 104 over the fixture fasteners 110 which were previously secured to the siding assembly 20 and vertical exterior surface 28. The cap nuts 114 are then threaded onto the fixture fasteners 110 and tightened to secure the light fixture 26 to the vertical exterior surface 28. At this point the installation is complete, with the siding box assembly 20 secured to the vertical exterior surface 28 and the light fixture secured to the siding box assembly 20.

As shown in FIG. 1, the rear peripheral wall 90 of the cover 24 includes grooves 116 to accommodate the posts 62 extending from the front peripheral wall 42 of the electrical junction box 22. This allows the cover 24 to slidingly engage the electrical junction box 22 prior to attaching the mounting bar 32 to the electrical junction box 22. This allows greater access to the juncture of the box 22, cover 24, and vertical surface 28 to enable an installer to caulk or otherwise apply a sealant around the periphery of the electrical junction box 22 to seal it against rain and moisture.

The preferred shape of the electrical junction box 22 and cover 24 described herein is circular. This is to eliminate the requirement of having to align any straight edges on the cover with the straight edge of the lapped siding, or any other angular siding that may be installed on the vertical surface 28. The circular shape of the electrical junction box 22 therefore greatly simplifies and reduces the time involved in installing a light fixture. An especially preferred embodiment of the circular electrical junction box 22 has an outer diameter of 4.0 inches. This enables an installer to prepare the desired location by drilling a hole in the siding with a standard 4-inch hole saw, which is readily available for purchase at most hardware stores. Circular electrical junction boxes could also be produced in other standard sizes, such as 3-inch, and 5-inch if desired, and the appropriate size hole saw used to prepare a mounting location.

Referring to FIGS. 1 and 2, any one of the removable wall portions 58 could be removed to create an electrical supply opening 100 in the back wall 36 of the electrical junction box 22. An electrical supply cable 92 could then be fed through the electrical supply opening 100 to provide electrical supply to the interior volume 44 of the electrical junction box 22. Additionally, a C-shaped fitting 118, such as the Black Button™ available from Arlington Industries, Inc., 1 Stauffer Industrial Place, Scranton, Pa., could be snapped into the electrical supply opening 100 to provide a quick snap-in type fitting that provides strain relief to any electrical cable 92 inserted therethrough.

The siding box assembly 20 of the present invention is particularly suitable to providing a mounting structure for an exterior light fixture on a vertical exterior surface 28 for which a stud or other structural member is not available in the desired location for the light fixture 26. For many framed structures, studs are typically spaced 16 inches apart and the substrate connecting the studs is typically a foam board such as Celotex®. The foam board substrate is not capable of supporting a light fixture. The outer covering of the building, such as lapped siding, is typically stronger and structurally capable of supporting a light fixture. Therefore, as shown in FIG. 1, with lapped siding 30 installed on the vertical exterior surface 28, the box-anchoring fasteners 80 are tightened into the lapped siding 30 to secure the electrical junction box 22 to the vertical surface 28. Conversely, if the substrate were a structurally sound material such as plywood, or if the location for mounting the light fixture 26 were centered on a stud, the box-anchoring fasteners 80 could be tightened into the substrate 98 to secure the electrical junction box 22 to the vertical surface 28. In this situation, the box-anchoring fasteners 80 would be secured through the apertures 60 in the first portion 52 of the back wall 36 to secure the electrical junction box 22 directly to the substrate 98. The siding box assembly 20 of the present invention provides the advantage of being appropriate for all types of sidings commonly encountered on existing buildings and new construction, including wood siding, vinyl siding, stucco, composite, shingles, and brick.

The siding box assembly 20 of the present invention has the advantage of providing an Underwriters Labs-listed box for enclosing all wiring connections. A vast majority of exterior lighting fixtures that are sold commercially today include only a metal mounting bar, bracket, or crossbar that is typically screwed directly into the exterior siding of the building. The only volume available for electrical connections is between the base of the lighting fixture and the exterior wall. The base is typically of shallow depth from the wall thereby forcing the installer to cram all electrical connections into the small volume of the base. This means that all the wiring connections are typically contacting the exterior siding of the building. The present invention provides a much greater degree of safety by providing a non-ignitable Underwriters Labs approved electrical junction box for enclosing all wiring connections.

Typical dimensions for a circular-shaped electrical junction box according to the present invention include an inside diameter of 3.84 inches and a depth of 0.813 inch, therefore providing a large interior volume of approximately 9.4 cubic inches for enclosing the wiring connections. This large volume provides a spacious area for holding wiring connections and ensures that all wiring connections are enclosed in a UL-listed box. This provides a much greater level of protection in case of electrical shorts or surges than does the small enclosed volume created by the prior art practice of mounting the light fixture base directly against the siding.

Having thus described the invention with reference to a preferred embodiment, it is to be understood that the invention is not so limited by the description herein but is defined as follows by the appended claims.

What is claimed is:

1. A siding box assembly for securing a light fixture to a vertical surface comprising;
    an electrical junction box including a back wall having a front surface, a rear surface, and a front peripheral wall extending from said front surface defining an interior volume therein;
    two or more ears extending outwardly from said front peripheral wall, said ears including apertures therein;
    said front peripheral wall of said electrical junction box having a base and a planar top edge;
    two or more posts integral with said electrical junction box extending from said base to said top edge;
    said posts including a top planar with said planar top edge of said front peripheral wall of said electrical junction box;
    said posts including fastener-accepting portions;
    two or more box-anchoring fasteners; and
    a cover having an outer periphery, a central opening, a front and a rear surface, and a rear peripheral wall extending from said rear surface of said cover and substantially surrounding said central opening;
    wherein said box-anchoring fasteners secure said electrical junction box to said vertical surface, said rear peripheral wall of said cover slidingly engages said front peripheral wall of said electrical junction box, and said light fixture is secured to said electrical junction box thereby creating a completely enclosed electrical junction box for housing all electrical connections to said light fixture.

2. The siding box assembly of claim 1 wherein grooves are provided in said rear peripheral wall of said cover to accommodate said posts of said front peripheral wall of said electrical junction box when said cover and said electrical junction box are slidingly engaged.

3. The siding box assembly of claim 1 wherein said back wall of said electrical junction box further includes
    a first portion planar with said base of said front peripheral wall of said electrical junction box;
    a raised portion interior of said first portion, said raised portion extending from said first portion into said interior volume of said electrical junction box;
    a recessed area in said rear surface of said back wall of said electrical junction box;
    one or more apertures in said first portion of said back wall; and
    one or more removable wall portions in said raised portion.

4. The siding box assembly of claim 3 wherein said removable wall portion is removed to create a cable opening therein in said back wall of said electrical junction box.

5. The siding box assembly of claim 3 wherein
    a portion of said vertical surface is removed to expose a substrate; and
    said apertures in said first portion of said back wall accept said box-anchoring fasteners to secure said electrical junction box to said substrate.

6. The siding box assembly of claim 5 that further includes raised walls surrounding said apertures in said first portion of said back wall, said raised walls extending from said front surface of said electrical junction box and into said interior volume of said electrical junction box.

7. The siding box assembly of claim 3 wherein removal of said removable wall portion from said raised portion allows a flush connection by a C-shaped fitting to said rear surface of said back wall of said electrical junction box.

* * * * *